US006871070B2

(12) United States Patent
Ejzak

(10) Patent No.: US 6,871,070 B2
(45) Date of Patent: Mar. 22, 2005

(54) COMMUNICATION SYSTEM FOR PROVIDING ROAMING BETWEEN AN INTERNET PROTOCOL MULTIMEDIA SYSTEM AND A CIRCUIT-SWITCHED DOMAIN

(75) Inventor: Richard Paul Ejzak, Wheaton, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 597 days.

(21) Appl. No.: 09/919,641

(22) Filed: Jul. 31, 2001

(65) Prior Publication Data

US 2003/0027569 A1 Feb. 6, 2003

(51) Int. Cl.[7] ................................................ H04Q 7/20
(52) U.S. Cl. ............................ 455/435.1; 455/432.1; 455/445; 455/426.1; 370/328; 370/338; 370/401
(58) Field of Search .......................... 455/435.1, 432.1, 455/445, 426.1; 370/328, 338, 401, 352, 356

(56) References Cited

U.S. PATENT DOCUMENTS

| 5,862,481 | A | * | 1/1999 | Kulkarni et al. | ......... 455/432.2 |
| 6,011,975 | A | * | 1/2000 | Emery et al. | ............ 455/456.1 |
| 6,122,263 | A | * | 9/2000 | Dahlin et al. | ............... 370/329 |
| 6,317,421 | B1 | * | 11/2001 | Wilhelmsson et al. | ...... 370/328 |
| 6,359,880 | B1 | * | 3/2002 | Curry et al. | ................. 370/352 |
| 6,389,008 | B1 | * | 5/2002 | Lupien et al. | .............. 370/352 |
| 6,400,950 | B1 | * | 6/2002 | Patel et al. | ............... 455/435.1 |
| 6,526,033 | B1 | * | 2/2003 | Wang et al. | ................ 370/338 |
| 6,546,247 | B1 | * | 4/2003 | Foti et al. | .................... 455/433 |
| 6,567,667 | B1 | * | 5/2003 | Gupta et al. | ............... 455/445 |
| 6,654,606 | B1 | * | 11/2003 | Foti et al. | .................... 370/392 |
| 6,725,036 | B1 | * | 4/2004 | Faccin et al. | ............... 455/433 |
| 6,731,617 | B1 | * | 5/2004 | Mizell et al. | ............... 370/328 |
| 2001/0031635 | A1 | * | 10/2001 | Bharatia | ..................... 455/432 |
| 2002/0037723 | A1 | * | 3/2002 | Roach | ......................... 455/435 |
| 2002/0056001 | A1 | * | 5/2002 | Magee et al. | ............... 709/225 |
| 2002/0110104 | A1 | * | 8/2002 | Surdila et al. | .............. 370/338 |
| 2002/0164984 | A1 | * | 11/2002 | Thakker | ..................... 455/435 |

* cited by examiner

*Primary Examiner*—William Trost
*Assistant Examiner*—Sharad Rampuria
(74) *Attorney, Agent, or Firm*—John B. MacIntyre

(57) ABSTRACT

A communication system includes User Equipment (111), Radio Access Network (RAN) (121), a packet-switched domain (131), an IP Multimedia Subsystem (IMS) (141), a circuit-switched domain (151), a Domain Name System (DNS) (165), a Charging Gateway Function (CGF) (134), an EIR (135), a Transport Signaling Gateway (T-SGW) (146), and a Roaming Signaling Gateway (R-SGW) (147). The CS domain (151) includes an interworking Mobile Switching Center (iMSC) (201). The iMSC (201) translates the CS domain registration, call control, feature control, and feature invocation procedures associated with the access technology to standard SIP procedures. The media gateway (MGW) (173) under the control of the iMSC (201) converts the air interface media flow into a packet stream that is managed by SIP procedures within the IMS (141). The iMSC (201) thereby allows for interworking between circuit-switched and packet-switched domains for provision of features and services while roaming between different kinds of home and serving systems.

13 Claims, 6 Drawing Sheets

COMMUNICATION SYSTEM FOR PROVIDING ROAMING BETWEEN AN INTERNET PROTOCOL MULTIMEDIA SYSTEM AND A CIRCUIT-SWITCHED DOMAIN

FIELD OF THE INVENTION

The present invention relates generally to communication systems, and more particularly to a third generation wireless communication system.

BACKGROUND OF THE INVENTION

Current wireless communication systems provide the ability for users to communicate to and from wireless or mobile users. There are generally two types of wireless communication systems, circuit-switched (CS) and packet-switched (PS).

In typical circuit-switched wireless communication systems, the Mobile Switching Center (MSC) connects the landline Public Switched Telephone Network (PSTN) system to the wireless communication system. The MSC is typically split into an MSC server and a Media Gateway (MGW), and incorporates the BICC (Bearer Independent Call Control) or ISUP (ISDN User Part) call control protocol for call delivery between MSCs.

The current approach to introducing Internet Protocol (IP) Multimedia services for Universal Mobile Telecommunications Service (UMTS) and Code Division Multiple Access (CDMA) Third generation (3G) systems is to define a brand new IP Multimedia Subsystem (IMS), comprised of a set of IP-connected network entities within the IMS using packet-switched services. These network entities provide IP Multimedia features and services using the Session Initiation Protocol (SIP) as the primary vehicle for call control.

The IMS shares little in common with the traditional MSC supporting circuit-switched services. Thus new capabilities and services must be defined, developed and deployed twice for systems supporting both circuit-switched and IP Multimedia services.

Therefore, a need exists for a communication system that supports features and services for mobile units using either circuit-switched or packet-switched communication systems.

BRIEF SUMMARY OF THE INVENTION

It is an object of the present invention to provide a communication system having features and services that can be utilized by both circuit-switched and packet-switched mobile units. Further, it is an object of the present invention to provide such features and services without having to provide separate software and/or hardware for CS or PS communication systems.

The present invention enables an IP Multimedia Subsystem (IMS) to support features and services for mobile units using either circuit-switched or IP Multimedia call control procedures. Thus the advantages of the IMS are available for mobile units using either circuit-switched or IP Multimedia call control procedures and new features and services can be defined, developed and deployed simultaneously for both CS and PS communication systems.

In particular, the architecture of the present invention enables home control of all services—whereby the IMS provides feature and service control from the home network rather than the serving network—to be available for all circuit-switched services. Furthermore, the present invention provides for fully interworking with systems using circuit-switched architecture. This same approach generalizes to allowing a single IMS with minor modifications to provide feature and service control for mobile units using various access technologies and call control protocols, including, for example, Session Initiation Protocol (SIP) over Asymmetric Digital Subscriber Line (ADSL), H.323 over Cable, and Integrated Services Digital Network (ISDN).

The present invention introduces a new logical entity into a communication system, an interworking MSC (iMSC) server. In the preferred embodiment of the present invention, the communication system utilizes a UMTS network architecture. Alternately, the communication system utilizes CDMA or other access technologies. The iMSC server translates the CS domain registration, call control, feature control, and feature invocation procedures associated with the access technology to standard SIP procedures. The iMSC server acts as a SIP UA (user agent) on behalf of the UE (user equipment) while otherwise behaving like the Proxy—Call State Control Function (P-CSCF) within the UMTS IMS. The media gateway (MGW) under the control of the iMSC server converts the air interface media flow into an RTP/UDP/IP packet stream that is managed by SIP procedures within the IMS.

In contrast to the traditional MSC, which performs all feature and service control for UEs it serves, the iMSC server of the present invention translates air interface control procedures into SIP, allowing all feature and service control to be performed by the Serving CSCF (S-CSCF) within the IMS.

To support UEs homed within an IMS while being served by a traditional MSC, the present invention provides for the IMS to emulate a Gateway MSC for terminating services.

Thus, the present invention provides a communication system that includes an iMSC that allows for interworking between CS domains and PS domains. This allows for easier integration of CS and PS domains, as well as providing enhanced services and features to mobile units.

DETAILED DESCRIPTION OF THE INVENTION

Figure 1:
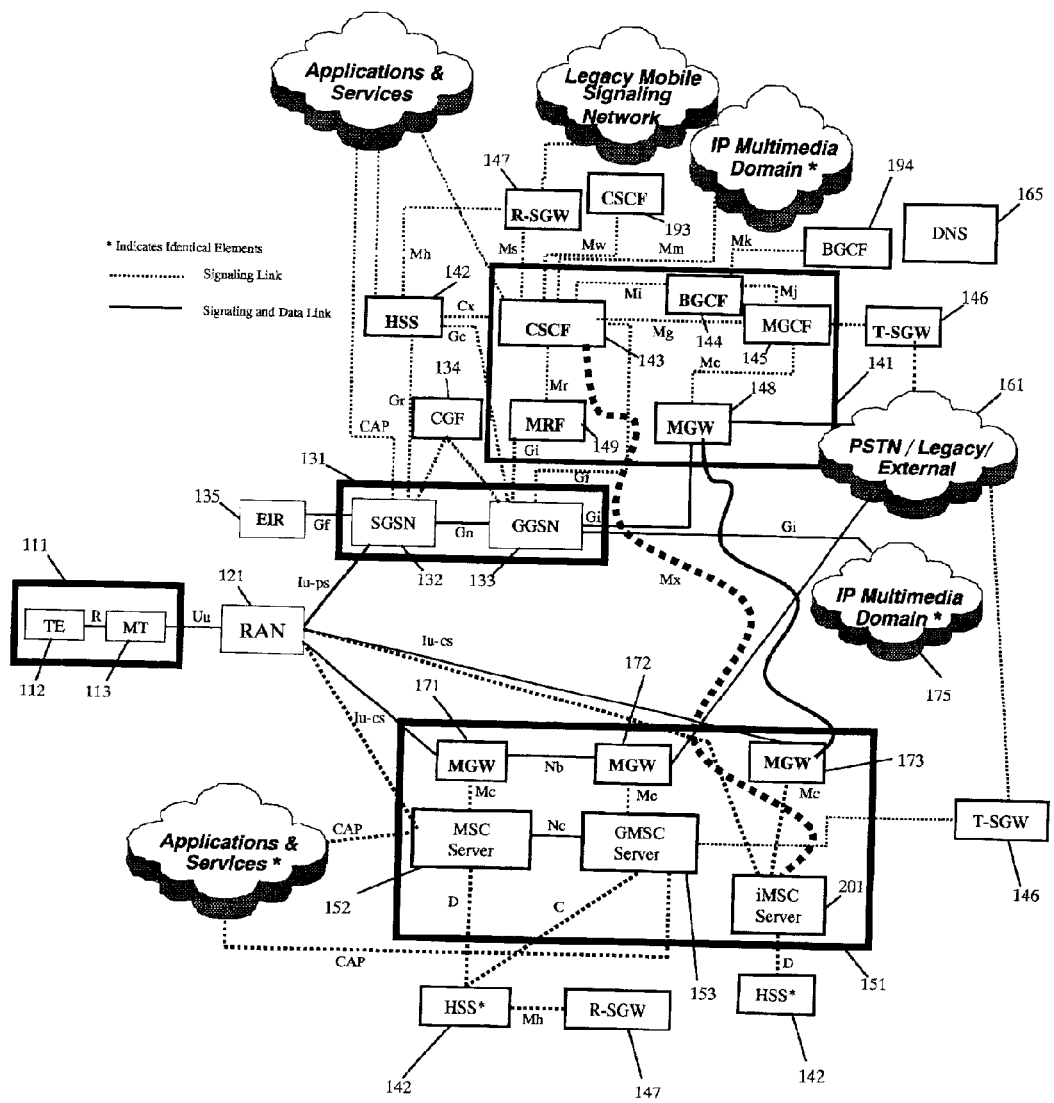
FIG. 1 depicts a communication system including an interworking MSC server in accordance with the present invention. Some interfaces between network entities are not shown.

The present invention can be better understood with reference to FIGS. 1–6. FIG. 1 depicts a communication system 100 in accordance with the present invention. In an exemplary embodiment depicted in FIG. 1, communication system 100 is a Third Generation (3G) wireless system. Communication system 100 can alternately be any digital cellular system. 3G wireless systems include multiple air interface standards, including cdma2000, Universal Mobile Telecommunications System (UMTS), Wideband CDMA (W-CDMA), Global System for Mobile Communications (GSM), and UWC-136, a TDMA-based technology.

FIG. 1 depicts 3GPP communication system 100 of a UMTS wireless network. Communication system 100 includes logical elements that have been defined based on network functions that have been grouped together to form each logical element. Actual implementation may contain multiple copies of these logical elements within multiple networks, and can merge any of these logical elements into single hardware entities. The architecture of the present invention is designed to utilize emerging Internet standards and protocols. An example of this is the use of Session Initiation Protocol (SIP) for IMS signaling for establishing a call. Use of emerging internet-based protocols allows for the IMS to provide internet-like functionality and services to mobile units along with voice and data services.

Communication system 100 includes a plurality of logical elements, comprising User Equipment 111, Radio Access Network (RAN) 121, packet-switched domain 131, IP Multimedia Subsystem (IMS) 141, circuit-switched domain 151, DNS 165, Charging Gateway Function (CGF) 134, EIR 135, T-SGW 146, and R-SGW 147.

Both the UMTS-based and GSM/EDGE-based Radio Access Networks are show in this figure. Charging Gateway Functionality (CGF) 134 has been added to the base 3GPP communication system 100 to show the collection of billing information in packet-switched domain 131. As depicted in FIG. 1, Radio Access Network (RAN) and packet-switched domain 131 are independent of IMS 141.

User Equipment (UE) 111 can be any device or combination of devices that can be used to connect with a wireless network. User Equipment, for example, can be comprised of Terminal Equipment (TE) 112 and a Mobile Termination (MT) 113. UE 111 is preferably a 3G mobile unit that communicates with communication system 100 via an air interface supported by communication system 100.

RAN 121 is preferably a UMTS Terrestrial Radio Access Network (UTRAN), which is the primary interface between the wireless device and the UMTS access network. Alternately, RAN 121 can be a GSM/EDGE Radio Access Network (GERAN), which is the primary interface between the wireless device and the GSM/EDGE access network. RAN 121 is coupled to UE 111 via an air interface, such as a 3G air interface.

Packet-switched domain 131 includes Serving GPRS Support Node (SGSN) 132 and Gateway Support Node (GGSN) 133. SGSN 132 provides packet mobility management, authentication, session management, accounting, mapping of IP addresses to IMSI, maintenance of mobile state information, and interfacing with GGSN 133. GGSN 133 provides interworking between the SGSNs and external packet data networks using IP.

IMS 141 preferably includes CSCF 143, BGCF 144, MGCF 145, MGW 148, and MRF 149.

CSCF 143 is a signaling entity for call/session control. CSCF 143 manages SIP sessions, provides features/services and coordinates with other network elements for session control, feature/service control and resource allocation.

CSCF 143 performs multiple functions, which in an exemplary embodiment include incoming call gateway, call control function, serving profile database, and address handling. In addition, in accordance with an exemplary embodiment of the present invention, CSCF 143 performs GMSC Emulation as necessary to support call delivery to IMS-homed subscribers being served by MSC server 152, and not being served by iMSC server 201. For subscribers being served by iMSC server 201, CSCF 143 provides features and services of the CS domain that are the same as those provided for subscribers being serviced by MSC server 152.

CSCF 143 has interfaces with many network elements, preferably as defined by the Third Generation Partnership Project standards, in standards document 3GPP TS 23.002. CSCF 143 is preferably connected to a plurality of elements using the SIP protocol. These network elements include GGSN 133 via interface Gi, UE 111 using interface Gm (not shown), MGCF 145 using interface Mg, BGCF 144 using interface Mi, MRF 149 using interface Mr, IP Multimedia Domain 175 (not shown), iMSC server 201, and other CSCFs, such as CSCF 193, using interfaces Mw. CSCF 143 is preferably coupled with HSS 142 via interface Cx, preferably using the LDAP protocol. CSCF 143 is preferably coupled to R-SGW 147 via interface Ms, which preferably uses a MAP protocol, but can alternately use a CAP or other SS7 application protocol. The logical functions of CSCF 143 are depicted in greater detail in FIG. 3 below.

BGCF 144 is a signaling entity for call/session control. The primary responsibility of BGCF 144 is to select the network to use for inter-working with PSTN 161 for a call from UE 111 to a PSTN address. BGCF 144 preferably performs additional functions, which include but are not limited to selection of the appropriate MGCF, hiding of network information from other networks, and provision of security through authorization of peer network elements.

BGCF 144 communicates with CSCF 143 via Mi interface, with MGCF 145 via Mj interface, and with BGCF 194 via Mk interface. These interfaces are defined in 3GPP TS 23.002. SIP is the preferred protocol for these standard interfaces. BGCF 144 may also have interfaces with other entities (not shown) to assist in making decisions within communication system 100.

BGCF 144 is preferably a logical entity from the 3GPP reference model. The actual implementation of BGCF 144 may be combined on the same platform with other logical entities that perform signaling functions such as CSCF 143, MGCF 145, T-SGW 146, and R-SGW 147.

To select a PSTN gateway, BGCF 144 in the home network receives the call origination message, which is an exemplary embodiment is a SIP INVITE message, from CSCF 143. The receipt of a call origination message from CSCF 143 indicates that the destination is a PSTN address. BGCF 144 needs to determine which network should be used to provide inter-working with PSTN 161. BGCF 144 may use data from multiple sources to make this determination. Examples of factors which BGCF 144 may look at in making this determination include, but are not limited to, the current location of the calling UE, the location of the PSTN address, local policies and business agreements between the visited and home networks, the desire to minimize path distance within the PSTN network, and a desire for the least-cost path. If the PSTN gateway is decided to be the home network, an MGCF within the home network, such as MGCF 145, will be selected. If the PSTN gateway is decided to be at another network, the BGCF address for the other network must be determined so that the processing may be forwarded to that network.

BGCF 144 also provides information hiding functionality. When two BGCFs are used across a network boundary, then the BGCFs may be used to hide local network information from the other network. BGCF 144 can also provide security in communication system 100. BGCF 144 provides security by performing authorization of peer network elements for peer-to-peer SIP application level communication.

MGCF 145 terminates signaling and provides the call control interface and translations between IMS 141 and PSTN 161. MGCF 145 also provides connection control for the media channels in MGW 148. MGCF 145 communicates with MGW 148 via the Mc interface, with BGCF 144 via the Mj interface, and with CSCF 143 via the Mg interface. MGCF 145 also preferably has signaling links to T-SGW 146.

MGCF 145 also preferably provides signaling to control a set of Media Gateways (MGW), such as MGW 148. This signaling is preferably in the form of H.248. With H.248, MGCF 145 is able to control establishment of bearer resources for sessions that require inter-working for bearer between PSTN 161 and IMS 141. For calls that require the services of a network operator's MGW, ports are allocated via requests from MGCF 145 within that network operator's network.

Signaling allows MGCF 145 to perform multiple operations with respect to MGW 148. These operations include MGW registration, bearer establishment control between IMS 141 and PSTN 161, request for allocation of media translation resources (i.e. compression, echo cancellation, vocoding, etc.), control of events detected at MGW 148, application of signals such as tones and announcements by MGW 148, and collection of statistics.

MGCF 145 preferably controls multiple MGWs. To be placed into service, the MGWs register themselves with their default MGCF. After registration with an MGCF, MGWs can begin bearer processing.

MGCF 145 preferably implements a SIP-based interface to CSCF 143. BGCF 144 may be in the signaling path between CSCF 143 and MGCF 145. Using this interface, MGCF 145 accepts commands from CSCF 143 to perform functions related to the control of a call.

MGW 148 is the element that translates between a media flow, such as voice, on a given IP network and bearer data on PSTN 161. MGW 148 terminates circuit-switched bearer traffic from PSTN 161 and terminates IP media flow as packet streams through GGSN 133 or MGW 173, eventually reaching UE 111. MGW 148 preferably performs vocoding and may also provide tones and announcements. If in-band signaling methods are supported at MGW 148, then for PSTN traffic using in-band signaling, MGW 148 preferably terminates both bearer and signaling traffic, and forwards the signaling messages to MGCF 145. MGW 148 interfaces with GGSN 133 via the Gi interface and with MGCF 145 via the Mc interface.

MGW 148 may include resources to modify a bearer stream. These resources allow MGW 148 to perform encoding, compression, echo cancellation, packetization, transcoding, packet timing synchronization, and packet loss handling.

MGW 148 preferably supports multiple types of voice encoding. These include, but are not limited to, G.711, Adaptive Multi-Rate (AMR), and other G.7xx encoding schemes. MGW 148 is preferably able to use G.711 to encode and decode voice on trunks connected to a PSTN network.

MGW 148 preferably organizes bearer connections using H.248 contexts containing terminations. MGW 148 may include numerous simultaneous contexts.

MGW 148 also preferably includes resources to support a plurality of signaling mechanisms, including but not limited to registration with MGCF 145, detection of events (e.g. Dual-Tone Multi-Frequency (DTMF) detection), application of tones and announcements to bearer streams, graceful teardown and random restart, notification, generation of statistics, and support of H.248 packages.

MRF 149 provides packet-based media services, such as advanced announcement generation and detection, N-way conferencing, tone and announcement generation, and future advanced media services, such as video mixing. MRF 149 also preferably provides transcoding and interactive voice response. MRF 149 interfaces with CSCF 143 via the Mr interface, with IP Multimedia Domain 175 (not shown), and with GGSN 133 via the Gi interface.

In an exemplary embodiment, MRF 149 comprises two parts, a controller part and a bearer part. CSCF 143 preferably interfaces with the MRF controller part to request media services using SIP. The controller part preferably communicates with the bearer part via H.248. The bearer part preferably supports RTP/UDP/IP. Some of the resources maintained by MRF 149 include vocoders, transcoders, compression entities, bearer-stream mixers, echo cancellors, and other DSP resources. Vocoders are needed at MRF 149 for transcoding and mixing of multimedia streams.

Circuit-switched domain 151 includes iMSC server 201, MSC server 152, GMSC server 153, and a plurality of media gateways (MGW). CS domain 151 is coupled to HSS 142 and Roaming SGW (R-SGW) 147. Not all CS domain interfaces are shown.

MGW 171, MGW 172 and MGW 173 may share some or all of the features of MGW 148. MSC server 152 controls MGW 171 via an H.248 control interface. MGW 171 supports inter-working of media flows between RAN 121 using the 3GPP Iu-cs interface, MGW 172 and PSTN 161 (not shown). GMSC server 153 controls MGW 172 via an H.248 control interface. MGW 172 supports inter-working of media flows between PSTN 161 and MGW 171. iMSC server 201 controls MGW 173 via an H.248 control interface. MGW 173 supports inter-working of media flows between RAN 121, MGW 148 and the IP Multimedia Domain 175 (not shown). The MGW media flows may use various transport and codec options, some of which are described under the description of MGW 148.

HSS 142 provides support for subscriber authentication, subscriber profile management, service authorization, subscriber location management, intersystem handover, and call routing. HSS 142 provides these functions for users receiving service from circuit-switched domain 151, packet-switched domain 131, and IMS 141.

HSS 142 preferably maintains a subscriber database that includes information including, but not limited to, the identity of the subscriber, services and associated policies, location, and authentication data.

HSS 142 supports the following interfaces. Interface Cx is the interface to CSCF 143. The preferred protocols for this interface are Diameter and LDAP. Interface Mh is the interface to R-SGW 147. Interface Gr is the interface to SGSN 132. Interface Gc is the interface to GGSN 133. Interface D is the interface to MSC Server 152 and iMSC server 201. Interface C is the interface to GMSC server 153. Interfaces Mh, Gr, Gc, D and C preferably utilize a MAP protocol.

In accordance with an exemplary embodiment of the present invention, HSS 142 recognizes when features and services are to be implemented for a subscriber at either MSC server 152 or IMS 141. In addition, HSS 142 supports procedures for IMS-homed mobile units being served either at iMSC Server 201 or at MSC Server 152.

Communication system 100 introduces a new functional element into the 3GPP architecture, iMSC server 201. iMSC server 201 allows the realization of an architecture that reuses most of the network elements of IMS 141 to provide features and services of CS domain core networks. iMSC server 201 is compatible with the existing CS domain core network model, and may in fact be realized as an overlay to this system. In particular, the function of iMSC server 201 is preferably implemented on the same platform as MSC server 152. This enables smooth interworking between CS domain 151 and iMSC-based systems until such time as iMSC servers are ubiquitously deployed and MSC servers are no longer required in the network. In a 3GPP2 all-IP network, iMSC server 201 and IMS 141 may also be utilized to perform features and services present in the 3GPP2 CS domain core networks.

iMSC server 201 preferably functions as a SIP User Agent (UA) and provides inter-working between wireless access network circuit-switched Call Control, such as 3GPP TS 24.008, and SIP. iMSC server 201 preferably includes a VLR to hold UE location information. The VLR in iMSC server 201 does not need to contain subscriber profile information for features and services under exclusive control of IMS 141.

iMSC server 201 performs multiple functions that include, but are not limited to, mobility management, inter-working with CSCF 143 for SIP signaling, control of MGW 148, address handling (AH), LCS, emergency service, media authorization and gating, control of tones and announcements towards UE 111 as a result of SIP call progress information, Short Message Service (SMS), and other services unrelated to circuit-switched call procedures, in a similar manner as MSC server 152.

For mobility management, iMSC server 201 performs attach, authentication, paging, location update (on the RAN side), intersystem handoff, and Serving Radio Network Subsystem (SRNS) relocation. In addition, iMSC server 201 preferably facilitates Short Message Services (SMS), which allows the user to send and receive SMS data to and from the SMS-GMSC/SMS-IWMSC (not shown).

iMSC server 201 can also provide call detail recording functionality. iMSC server 201 preferably performs this functionality by providing collection of call and/or event detail information for the purpose of assisting with the tasks of billing, revenue sharing, Transfer Account Procedure (TAP), statistics collection, and quality of service assessment.

For inter-working with CSCF 143 for SIP Signaling, iMSC server 201 provides interworking between mobility management procedures defined in 3GPP TS 24.008 such as IMSI Attach, Detach, and inter-iMSC Location Update, and SIP registration and de-registration procedures.

In an exemplary embodiment, iMSC server 201 also provides interworking between call handling procedures as defined in 3GPP TS 24.008 and SIP call control procedures. iMSC server 201 can also provide interworking between supplemental services invocations as defined in 3GPP TS 24.010 and SIP call control procedures. iMSC server 201 also provides interworking between any handover procedures requiring coder/decoder (codec) changes and SIP call control procedures to trigger any necessary transcoder changes in IMS 141. In one embodiment, iMSC server 201 can make these codec changes transparent by doing transcoding in attached MGW 173.

iMSC server 201 also formulates a Uniform Resource Locator (URL) from IMSI, and queries Domain Name System (DNS) 165 with the URL to obtain an I-CSCF address, preferably utilizing ENUM/DNS. IMSC server 201 is also able to locate HSS 142 using SS7 Global Title Translation (GTT) on IMSI.

In an exemplary embodiment, communication system 100 includes iMSC server 201 and MSC server 152. iMSC server 201 performs some of the same functions as MSC server 152. Examples include 3GPP mobility management, control of an MGW, location service, emergency service, short message service, and other services unrelated to CS call procedures. For subscribers being served by MSC server 152, MSC server 152 performs functions that are not required of an iMSC server. Examples include call-related supplementary services, such as call barring and multi-party calls, and call control interfaces with GMSC server 153 and PSTN 161.

R-SGW 147 terminates transport protocols for signaling between CS domain 151, PS domain 113, and IMS 141. The services of R-SGW 147 are preferably used to ensure transport interworking between the SS7 and the IP transport of signaling on its various interfaces (not all shown). R-SGW 147 communicates with CSCF 143 and HSS 142 via the Ms and Mh interfaces, respectively.

R-SGW 147 provides for HSS Subscriber roaming into circuit-switched wireless networks and transport of circuit-switched signaling over IP, such as TCP/IP.

Domain Name System 165 provides a standardized database and a standardized protocol to store and retrieve information about domain names from the database. Queries are sent to DNS 165, which responds with the associated resource records for the requested input. In an exemplary embodiment, DNS 165 also includes the functionality of an ENUM server.

In accordance with an exemplary embodiment, DNS 165 maps a telephone number to a set of attributes that can be used to contact a resource associated with that telephone number. Multiple sets of attributes can be associated with a single telephone number, such as a set of attributes related to SIP service, a set of attributes related to LDAP or MAP service, and a set of attributes related to PSTN service. If a telephone number in DNS 165 contains SIP service attributes, the result of an ENUM translation from DNS 165 is a domain name of the SIP server for the user with that telephone number. A subsequent query to DNS 165 with that domain name determines the IP address of the SIP server.

When a mobile unit registers, iMSC server 201 queries DNS 165 to obtain the domain name and subsequently the IP address of the I-CSCF to which it shall forward the registration message. The I-CSCF can then do a query to DNS 165 to get the domain name and subsequently the IP address of the HSS to query. Alternately, the I-CSCF can have the domain name of the HSS provisioned in its database, and a traditional DNS query for the IP address is all that is needed.

When a mobile unit originates a call for delivery through IMS 141 to an E.164 number destination, the S-CSCF receives a SIP INVITE message, which causes the S-CSCF to query DNS 165 to determine how to proceed with the call initiation. DNS 165 responds with the sets of attributes associated with the E.164 number. If one of those sets of attributes is for SIP service (e.g. mobile-to-mobile or IMS-to-IMS), the S-CSCF knows that the SIP INVITE message may be forwarded directly using SIP signaling. A second DNS query resolves the replacement domain name to a set of IP addresses, with a precedence ordering. If no set of attributes associated with SIP service for this E.164 number is available, DNS 165 replies with a set of attributes associated with PSTN service. The S-CSCF will then forward the SIP INVITE message to BGCF 144, which then forwards the message to MGCF 145, which routes the call to PSTN 161. The selection of MGCF 145 may be based on provisioned data in BGCF 144 or BGCF 144 may use the TRIP protocol to select a MGCF. It should be noted that even if the E.164 number is associated with a PSTN party, the response of DNS 165 may also include a set of attributes for SIP service for that E.164 number.

Charging Gateway Function (CGF) 134 collects the accounting records for CS domain 151, PS domain 131, and IMS 141.

EIR 135 stores a list of unique International Mobile Equipment Identity (IMEI) numbers that identify each terminal in the network. This facilitates identification of fraudulent mobile units.

T-SGW 146 provides transport level interworking between PSTN 161 and IMS 141, between PSTN 161 and GMSC server 153, and between PSTN 161 and MSC server 152 (not shown). When connected to IMS 141, T-SGW 146 transports call-related out-of-band signaling from PSTN 161 onto an IP bearer and sends it to MGCF 145, transports call-related signaling from IMS 141 (specifically from MGCF 145) to PSTN 161, and provides PSTN-to-IP-level address management. T-SGW 146 provides similar services when connected to GMSC server 153 and MSC server 152.

T-SGW 146 and one of the plurality of MGWs are used when a PSTN user is one of the parties involved in a call leg. T-SGW 146 provides for SS7 applications to communicate via IP transport.

Figure 2:
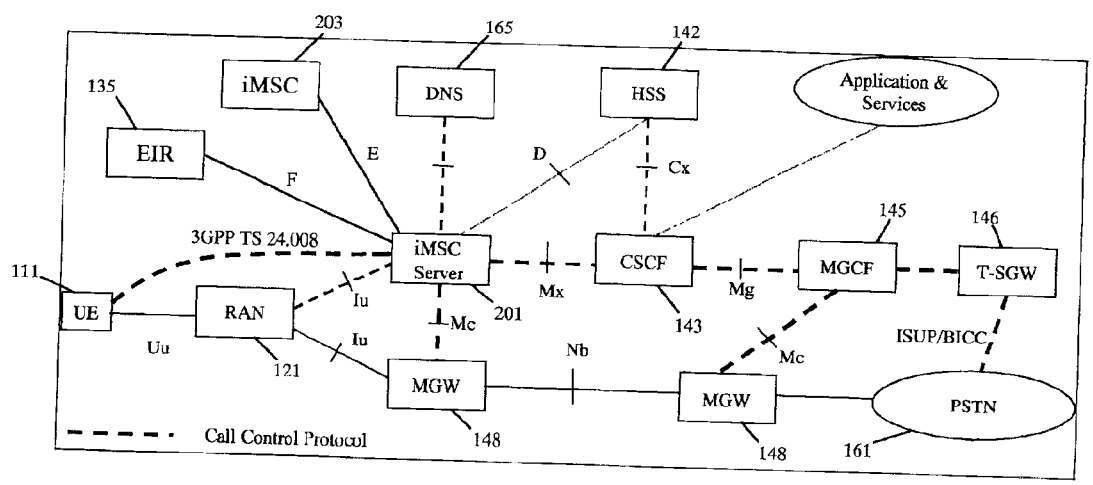
FIG. 2 depicts a simplified architectural representation of the communication system of FIG. 1 depicting the interfaces between the iMSC server and other network elements in accordance with the present invention.

FIG. 2 depicts an architectural representation 200 of communication system 100 of FIG. 1 depicting the interfaces between iMSC server 201 and other network elements in accordance with the present invention. iMSC server 201 is coupled to a plurality of additional network elements via a plurality of interfaces. Only a subset of the network elements and interfaces are shown in FIG. 2 to highlight the new functions of the iMSC server 201. In an exemplary embodiment of the present invention, iMSC server 201 is coupled to User Equipment 111 via an indirect interface. In a UMTS system, for example, this indirect interface uses protocol 3GPP TS 24.008.

iMSC server 201 is preferably coupled to RAN 121 via interface Iu-cs, utilizing a RANAP protocol.

iMSC server 201 is coupled to HSS 142 via interface D, which in an exemplary embodiment uses the MAP protocol.

iMSC server 201 can also be coupled to other iMSC servers 203, for purposes of, for example, performing inter-system handoffs. The iMSC servers are preferably coupled via an E interface utilizing a MAP protocol.

iMSC server 201 can also be coupled to EIR 135 via interface F. Interface F preferably utilizes a MAP protocol.

iMSC server 201 is also preferably connected to other iMSC servers using interface G., not shown. Interface G preferably utilizes the MAP protocol. This is used for the retrieval of the IMSI and authentication parameters from the previous serving system, whether an iMSC server or MSC server.

iMSC server 201 can also be coupled to SGSN 132, not shown, using interface Gs. Interface Gs preferably uses a MAP protocol.

iMSC server 201 can further be coupled to a Gateway Mobile Location Center (GMLC, not shown) for location control services using interface Lg. Interface Lg preferably uses a MAP protocol.

iMSC server 201 is coupled to MGW 148 via interface Mc, which is preferably an H.248 interface. iMSC server 201 is coupled to DNS 165 via a public IP interface.

iMSC server 201 is coupled to CSCF 143 via interface Mx, which preferably uses the SIP protocol. Interface Mx is a new interface for 3GPP systems. In prior art 3GPP systems, there was no signaling interface between CSCF 143 and circuit-switched domain 151. By adding this signaling interface, iMSC server 201 has been enabled to provide services and functions to both IMS 141 and CS domain 151 without having to develop separate, redundant software and hardware on both IMS 141 and CS domain 151.

Figure 3:
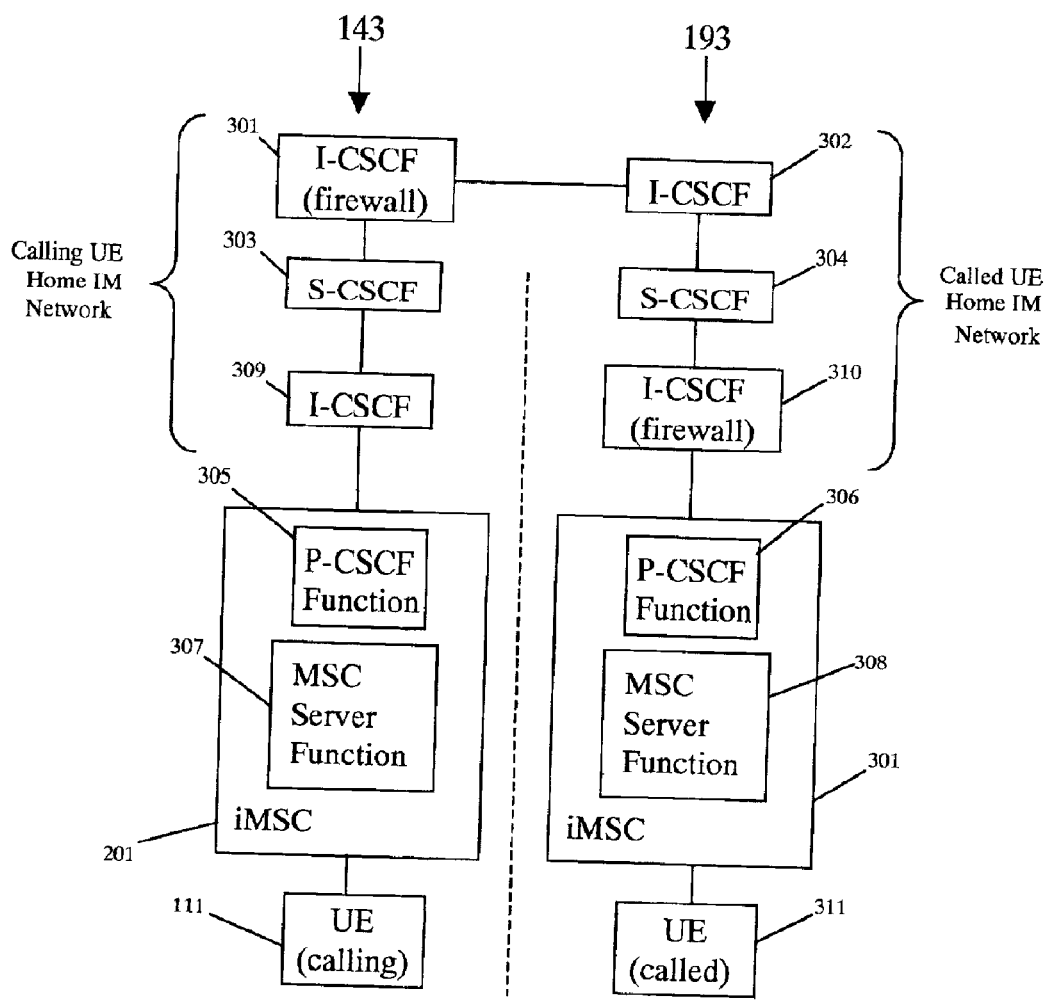
FIG. 3 depicts a representation of the functions of a call state control function in accordance with the present invention.

FIG. 3 depicts a representation 300 of the functions of CSCF 143 in accordance with the present invention. FIG. 3 shows the relationship of the logical CSCF roles 143 and 193 for SIP signaling in a "mobile-to-mobile" call, i.e. one 3GPP UE 111 initiating a SIP session with another 3GPP UE 311. The firewall I-CSCFs 301 and 310 are optional. The other logical CSCF roles are used for this type of call. However, within a particular network some or all of the logical roles may be combined onto a single physical entity.

In a preferred embodiment of the present invention, CSCF 143 performs one or more of the following roles. CSCF 143 can act as the Serving-CSCF (S-CSCF) 303, which is the session control point for UE 111 as calling party. CSCF 143 can also serve as the interrogating CSCF (I-CSCF) 309, which is the contact point into the home network of UE 111 for other networks. CSCF 143 may also serve as I-CSCF 301, which hides network topology for outgoing signaling to other networks. In addition, CSCF 143 can serve as a proxy CSCF (P-CSCF) 305, which is the contact point into IMS 141 for UE 111. P-CSCF function 305 is not needed for subscribers being served by an iMSC server, which includes some P-CSCF message routing functionality.

In a preferred embodiment of the present invention, CSCF 193 performs one or more of the following roles. CSCF 193 can act as the Serving-CSCF (S-CSCF) 304, which is the session control point for UE 311 as called party. CSCF 193 can also serve as the interrogating CSCF (I-CSCF) 302, which is the contact point into the home network of UE 311 for other networks. CSCF 193 may also serve as I-CSCF 310, which hides network topology for outgoing signaling to other networks. In addition, CSCF 193 can serve as a proxy CSCF (P-CSCF) 306, which is the contact point into IMS 141 for UE 311. P-CSCF function 306 is not needed for subscribers being served by an iMSC server, which includes some P-CSCF message routing functionality.

S-CSCFs 303 and 304 are preferably stateful SIP servers. That is, state information is maintained at these CSCF entities for the duration of the registration period. I-CSCFs 301, 302, 309 and 310 may be stateful, depending on what functions they perform. In the preferred embodiment, I-CSCFs 302 and 309 only perform an initial routing function at the start of each session, will remove themselves from the path for subsequent signaling, and do not need to maintain state information. If I-CSCFs 301 and 310 perform a firewall function to hide network topology, then they will be stateful.

S-CSCFs 303 and 304 perform the session control services for each endpoint. S-CSCFs 303 and 304 maintain session state as needed by the network operator(s) for support of the services. Within an operator's network, different S-CSCFs may perform different functions. The functions performed by S-CSCFs 303 and 304 include, but are not limited to, receiving and processing SIP-level registrations from subscribers, providing session control for the registered endpoint sessions, and providing service triggers for and interacting with Services Platforms, such as CAMEL.

S-CSCFs 303 and 304 receive and process SIP-level registrations from subscribers. In concert with HSS 142, S-CSCFs 303 and 304 act like Registrars. In other words, S-CSCFs 303 and 304 accept Register requests and make their information available through HSSs 142. HSSs 142 are preferably updated with the S-CSCF addresses and send the subscriber data to the corresponding S-CSCFs for storage.

S-CSCFs 303 and 304 provide session control for the registered endpoints' sessions. S-CSCFs 303 and 304 interact with HSSs 142 in each home domain to receive profile information and profile information updates for each subscriber. In an exemplary embodiment, S-CSCF 303 keeps a local copy of the profile for the subscriber using UE 111, and S-CSCF 304 keeps a local copy of the profile information for the subscriber using UE 311. S-CSCF 303 performs call origination services and state/event management. S-CSCF 304 performs call termination services and state/event management.

S-CSCF 303 interacts with BGCF 144 and MGCF 145 for calls to PSTN 161. S-CSCF 304 interacts with MGCF 145 for calls from PSTN 161. S-CSCFs 303 and 304 also choose and interact with MRFs 149 to support multi-party and other services.

S-CSCF 303 preferably checks whether the requested outgoing communication is allowed given the current subscription. S-CSCF 304 preferably checks whether the requested incoming communication is allowed given the current subscription. Location-based services are preferably provided by iMSC servers 201 and 301, and not CSCFs 143 and 193.

For a mobile-originated call to another IMS-homed subscriber, S-CSCF 303 obtains from DNS 165 the address of I-CSCF 302 for the network operator serving the destination subscriber using the destination name of the terminating subscriber (e.g. dialed E.164 phone number or SIP URL), and sends the SIP request or response to I-CSCF 302, which may be in the same network as the originator or in another network.

For a mobile-originated call to a PSTN address, S-CSCF 303 sends the SIP request to BGCF 144 within the operator's network. Further, S-CSCF 303 preferably provides call monitoring and logging for billing.

For a mobile-terminated call to UE 311 being served at iMSC server 301 in its home network, S-CSCF 304 sends the SIP request or response directly to iMSC server 301. For a mobile-terminated call to UE 311 being served at iMSC server in a visited network, S-CSCF 304 can either send the SIP request or response directly to iMSC server 301 or alternately send these messages via I-CSCF 310 in the home network.

Interrogating-CSCF (I-CSCF) 302 is preferably the contact point within an operator's network for all calls destined to a subscriber of that network operator. There may be multiple I-CSCFs within an operator's network. The functions performed by I-CSCFs 302 and 310 preferably include registration, session flows, querying of HSS 142 for the address of S-CSCF 304, and firewall protection. For registration, I-CSCF 310 preferably selects S-CSCF 304 for a user performing SIP registration. For session flows, I-CSCF 302 routes a SIP request received from another network to S-CSCF 304. For querying, I-CSCF 302 or 310 queries HSS 142 for the address of S-CSCF 304.

For firewall protection, the operator may use I-CSCFs 301 or 310 to hide the configuration, capacity, and topology of its network from the outside. When I-CSCF 301 is chosen to meet the hiding requirement, then for sessions traversing different operators domains, I-CSCF 301 may send the SIP request or response to another I-CSCF, such as I-CSCF 302. This allows the operator to hide the S-CSCF address.

A user may receive services based on subscription or on a per request basis. S-CSCFs 303 and 304 are preferably the entities responsible for coordinating service control logic most of the time. iMSC servers 201 and 301 are involved for some services, such as location and emergency services. The services will be implemented either in S-CSCFs 303 and 304, or else via application servers connected to these S-CSCFs, which may be SIP-based, part of the CAMEL Service Environment (CSE), or part of the Open Service Access (OSA) architecture.

Figure 4:
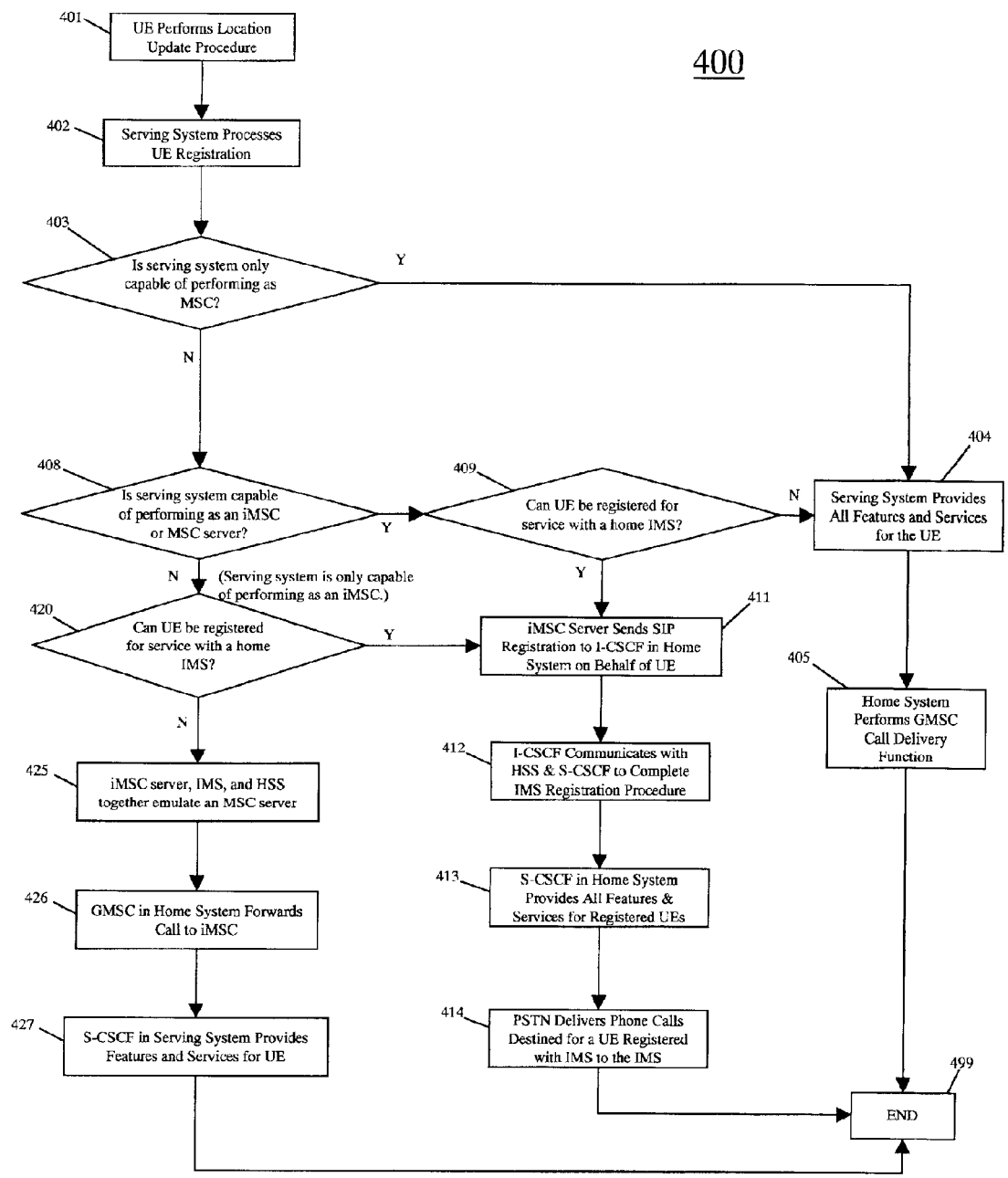
FIG. 4 depicts a flow chart of a mobile unit registering with the communication system of the present invention.

FIG. 4 depicts a flow chart 400 of a mobile unit registering with the communication system of the present invention. A UE performs (401) a location update (registration) procedure to register for service with the CS domain or to indicate a change in serving system, as defined in 3GPP TS 24.008. The serving system is an MSC, an iMSC server, or a system capable of performing as either an MSC or an iMSC. The serving system processes (402) the registration in the normal manner, which includes authenticating the UE and informing the HSS of the location of the current serving system. Note that the term MSC refers to the combination of an MSC server and any MGW it controls. Similarly, the term iMSC refers to the combination of an iMSC server and any MGW it controls.

The system now determines if the serving system can process the mobile unit as an MSC or as an iMSC. If (403) the serving system is only capable of performing as an MSC, then the serving system provides (404) all features and services for the UE according to standard MSC procedures. Also, the home system performs (405) the GMSC call delivery functions for phone calls destined for the UE that it processes. If the PSTN delivers phone calls destined for the UE to a GMSC, then the GMSC and the UE's HSS follows standard procedures to deliver calls to the serving system performing as an MSC. If the PSTN delivers phone calls destined for the UE to an IMS, then the IMS and the UE's HSS emulate the functions of a GMSC when delivering calls to a UE served by an MSC. This capability is important to continue to support UEs while they roam into systems without fully deployed iMSCs. The process then ends (499).

If (408) the serving system is capable of performing as an iMSC or as an MSC, then for each registering UE, the serving system determines (409) if the UE can be registered for service with a home IMS. If the serving system determines that the UE cannot be registered for service with a home IMS, the serving system performs as an MSC and performs steps 404 and 405 as described above.

If the UE can be registered for service with a home IMS, the serving system will perform as an iMSC.

For UEs homed on an IMS, the iMSC appears to the home IMS from a signaling perspective as if it were a P-CSCF. The iMSC uses DNS to determine if there is an I-CSCF address associated with the IMSI of the UE, which indicates that the UE is homed in an IMS. The iMSC sends (411) the SIP registration message to the I-CSCF in the home system on behalf of the UE. The I-CSCF then communicates (412) with the HSS and S-CSCF to complete the standard IMS registration procedure.

As part of the registration procedure, the HSS sends subscriber profile information to the S-CSCF. This subscriber profile information includes information about features and services provisioned for the UE. The S-CSCF in the home IMS then provides (413) all features and services for registered UEs, providing for true home control of all services at a single point in the network. The S-CSCF may provide these features and services directly or indirectly. To provide the features and services indirectly, the S-CSCF sends standard SIP signaling to one or more application servers in the network. Although the exemplary embodiment describes the case where the S-CSCF directly provides features and services, the procedures described here also apply, with minor modifications, when the S-CSCF provides features and services for the UE indirectly through application servers. The PSTN delivers (414) phone calls destined for a UE that can be registered for service with an IMS to that IMS. The process then ends (499).

If (420) the serving system is only capable of performing as an iMSC as determined at steps 403 and 408, the serving system performs as an iMSC as described in steps 411-414 above for UEs registered with a home IMS.

As described up to this point, this serving system (restricted to functioning as an iMSC) is incapable of supporting UEs for which the PSTN delivers calls destined for that UE to a GMSC. Let us call this a GMSC-homed UE. In an alternate embodiment, it is possible for a serving system only capable of performing as an iMSC to support GMSC-homed UEs by providing for the iMSC, IMS, and HSS together to emulate (425) the functions of an MSC from the perspective of the GMSC. In one embodiment, the iMSC, when realizing that a home IMS does not exist for a UE, registers (421) the UE with a default IMS server to perform MSC emulation. As part of the registration process, the IMS assigns a temporary PSTN number associated with an MGCF for use by the GMSC during the call delivery procedure. The iMSC stores this number during registration and reports it to the GMSC during the standard call delivery procedure, appearing to the HSS and GMSC as a standard MSC.

During a call delivery scenario, the GMSC forwards (426) the call to the IMS, and the S-CSCF in the IMS performs a standard profile request of the HSS/HLR so that it can perform or arrange for the performance of the provisioned features and services. Alternately, the iMSC may register the UE with a home IMS even though the PSTN delivers calls destined for that UE to a GMSC (so it is GMSC-homed). In this case there is no modification to the iMSC, but the HSS and S-CSCF together emulate the standard call delivery sequence from the perspective of the GMSC. In so doing, the S-CSCF allocates a temporary PSTN number associated with an MGCF and signals the number to the GMSC for use by the GMSC to forward the call during the call delivery procedure. Similarly to the previous case, the S-CSCF in the IMS performs a standard profile request of the HSS/HLR so that it can perform or arrange for the performance of the provisioned features and services.

Figure 5:
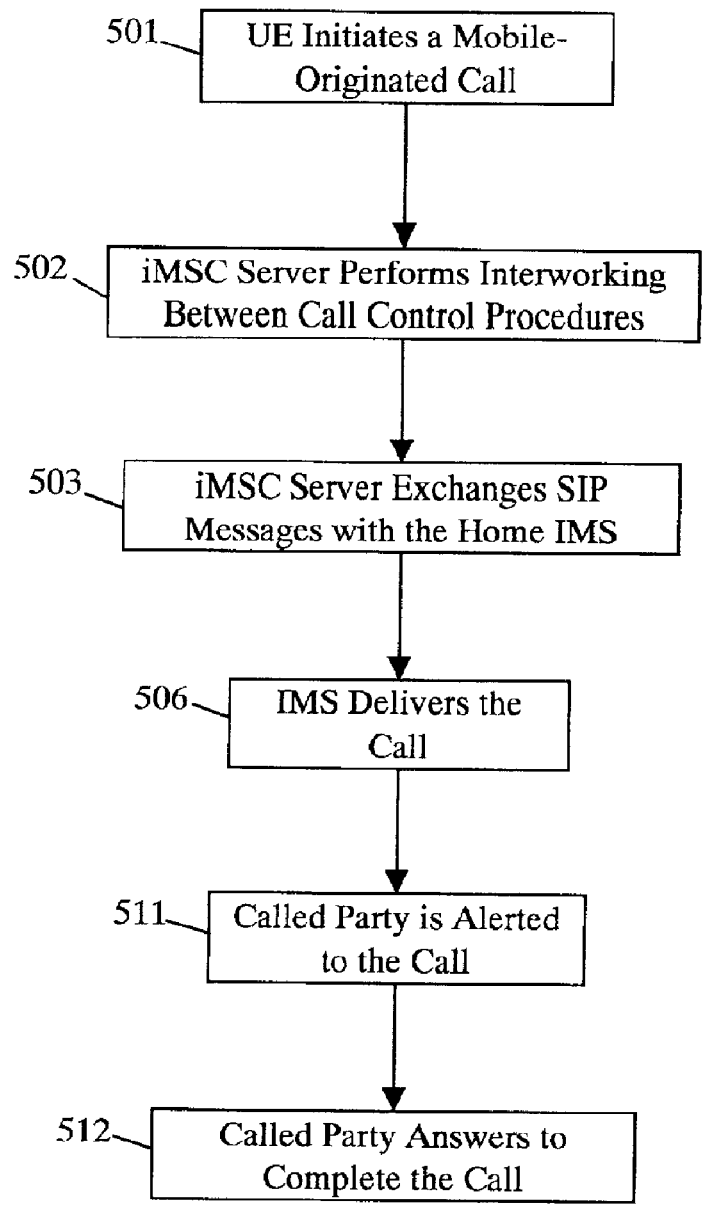
FIG. 5 depicts a flow chart of a mobile unit originating a call with the communication system of the present invention.

FIG. 5 depicts a flow chart 500 of a mobile unit originating a call with the communication system of the present invention. When a UE initiates (501) a mobile-originated call while being served by an iMSC and the UE's home IMS, the UE performs normal call origination signaling with the RAN and iMSC, according to 3GPP TS 24.008. The iMSC performs (502) interworking between 3GPP TS 24.008 call control and SIP call control procedures. The iMSC also exchanges (503) SIP messages on the Mx interface with the home IMS. For simple calls, the signaling interworking is a straightforward mapping of call states, messages, and message parameters between 3GPP TS 24.008 and SIP. From a signaling perspective, the iMSC appears to the home IMS as if it were a P-CSCF.

The messaging on the Mx interface can be sent either directly to the S-CSCF in the home IMS, or to the I-CSCF in the home IMS. When sent to the I-CSCF, the I-CSCF forwards the SIP messaging to the S-CSCF. Either way, the SIP messaging on the Mx interface follows standard IMS procedures.

The IMS then delivers (506) the call. This can preferably be done using one of four options, which all follow standard procedures. The first option is for the IMS to forward the call to an MGCF via an S-CSCF and BGCF for delivery to an end user in the PSTN. The second option is for the IMS to forward the call to an IMS for delivery to another IMS-homed UE via an S-CSCF and optionally an I-CSCF. The third option is for the IMS to forward the call to a GMSC for delivery to a GMSC-homed UE via an S-CSCF, BGCF, and MGCF. The fourth option is for the IMS to forward the call to the IP multimedia network for delivery to a SIP endpoint outside of the PLMN via an S-CSCF and optionally an I-CSCF.

In the normal case, after the user originates the call from the UE, the called party is alerted (511) of the call, and then answers (512) to complete the call.

Figure 6:
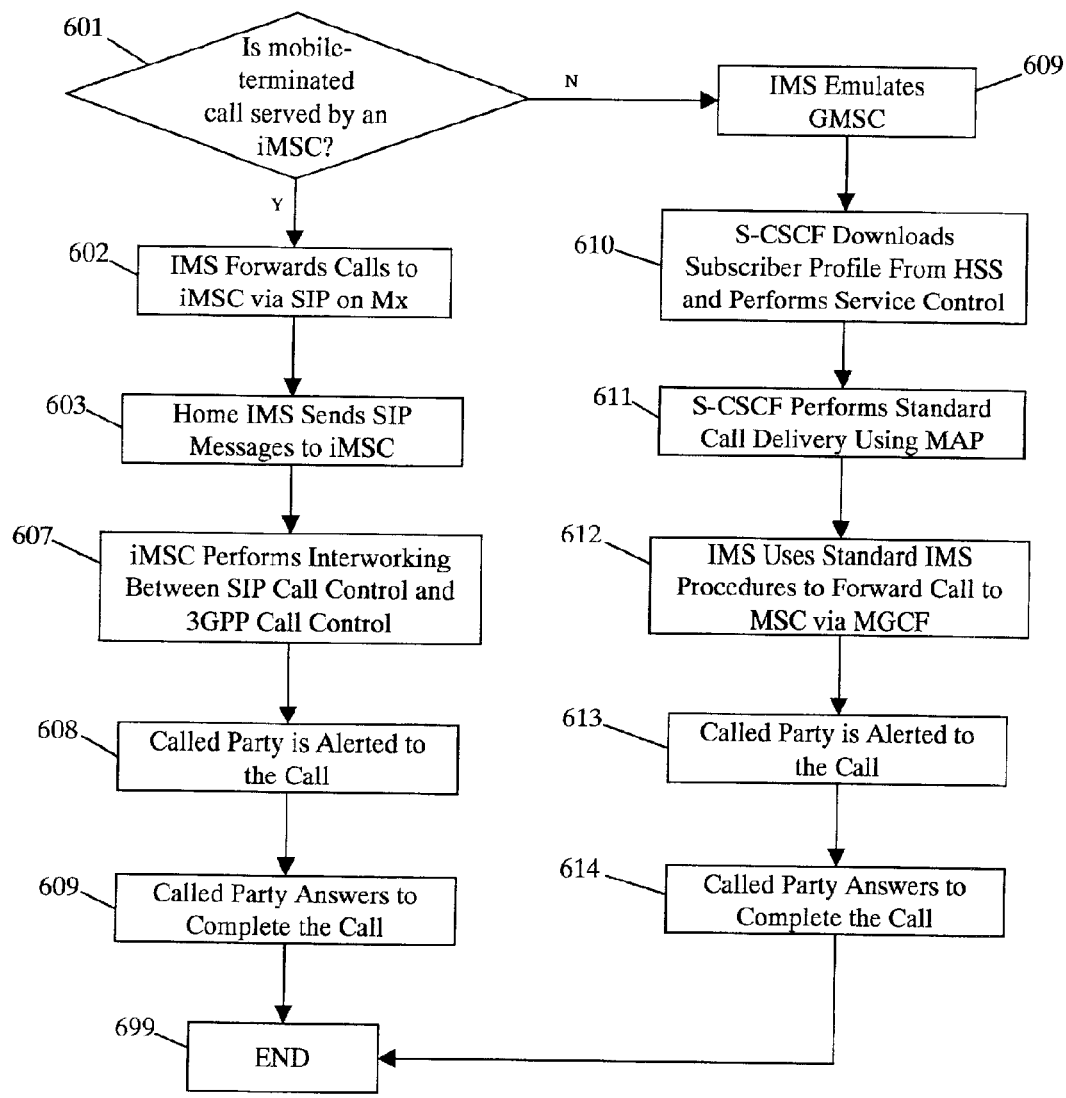
FIG. 6 depicts a flow chart of a mobile unit terminating a call with the communication system of the present invention.

FIG. 6 depicts a flow chart 600 of a mobile unit terminating a call with the communication system of the present invention. The serving system determines (601) if the mobile-terminated call is delivered to a UE being served by an iMSC and the UE's home IMS. If so, the IMS forwards (602) calls it receives that are destined for the UE to the iMSC via SIP on the Mx interface. The IMS preferably receives calls destined for the UE from four possible sources. The first source is from the PSTN via an MGCF, I-CSCF, and S-CSCF. The second source if from an IMS on behalf of another UE via an I-CSCF and S-CSCF. The third source is from the PLMN via an MGCF, I-CSCF, and S-CSCF. The fourth source is from a SIP endpoint outside of the PLMN via the IP multimedia network, I-CSCF, and S-CSCF.

From a signaling perspective, the home IMS and iMSC interact as if the iMSC were a P-CSCF within the IMS. The S-CSCF in the home IMS sends (603) SIP messages either directly to the iMSC, or to the I-CSCF in the home IMS, which forwards them to the iMSC. Either way, the SIP messaging on the Mx interface follows standard IMS procedures. The iMSC then performs (607) interworking between SIP call control procedures on the Mx interface and 3GPP TS 24.008 call control procedures towards the UE. For simple mobile-terminated calls, the signaling interworking is a straightforward mapping of call states, messages, and message parameters between SIP and 3GPP TS 24.008. In the normal case, the iMSC pages the UE, which alerts (608) the user, who answers (609) to complete the call.

If the mobile-terminated call delivery is to a UE being served by an MSC as determined in step 601, the home IMS emulates (609) the operation of the GMSC from the perspective of the MSC. Once the call is delivered to the S-CSCF in the home IMS, the HSS is aware of the identity of the MSC serving the UE and the S-CSCF is aware that the UE is not registered with the IMS for standard IMS call delivery procedures (no iMSC or P-CSCF has been allocated to serve this UE). The S-CSCF downloads (610) the subscriber profile information from the HSS so that it can perform any features and services unique to the GMSC function in the IMS and the UE. The S-CSCF then performs (611) the standard call delivery procedure with the HSS and MSC, receiving a temporary PSTN number from the MSC for forwarding of the call. The S-CSCF uses C interface procedures with the HSS to accomplish this, while the HSS communicates with the MSC using D interface procedures. The IMS uses (612) standard IMS procedures to forward the call to the temporary PSTN number via the S-CSCF, BGCF, and MGCF for presentation to the MSC. Alternately, the IMS could forward the call directly to the MSC using SIP if the MSC supports SIP on the signaling interface (Nc) between the GMSC and MSC. The MSC alerts (613) the called party, who answers (614) to complete the call.

Note that if the Nc interface supports SIP, the MSC continues to supports the bulk of the features and services for the UE, in contrast to the iMSC, which passes responsibility for call-related features and services to the home IMS.

In all scenarios involving an iMSC and home IMS, responsibility for handling of call-related features and services lies with the home IMS. To realize this requires the specification of interworking of feature and service control signaling between SIP call control and 3GPP supplementary services, as defined in 3GPP TS 24.010 and related specifications. Although the exemplary embodiment described herein described one embodiment of practicing the present invention, it should be understood that the present invention can be easily modified to provide supplementary services using other methods. Note that it is only necessary to demonstrate that SIP has sufficient protocol features and extensibility to allow realization of enhanced features and services. Interworking between protocols of equivalent functionality is then straightforward to specify.

There are four basic operations that need to be possible in SIP to realize 3GPP supplementary services: provision, query, control, and invocation. It is possible to define new features and provision their availability per subscriber, along with any parameters governing operation of the feature, such as time limits or group identity. SIP option tags allow for independent definition of arbitrary new features, parameters associated with those features, and procedures associated with those features. This provisioned information is available as subscriber data in the HSS, which is downloaded as subscriber profile information to the S-CSCF during registration. Thus provisioning of 3GPP supplementary services is realizable within SIP.

The SIP OPTIONS method allows a SIP entity to query another as to its capabilities. The queried entity responds with current features and parameters using the Supported header field, option tags, and miscellaneous parameters. Thus the iMSC is capable of querying the S-CSCF in the home IMS to determine the status of provisioned features associated with a UE.

The SIP Require header field may be included within the REGISTER, OPTIONS, or possibly other methods to control the expected behavior of various features. The Require header contains option tags, and additional feature-specific parameters may be associated with each option tag. The response to a particular feature in a Require header within a particular method may be independently specified in each case. Typically the iMSC will use this procedure to relay feature modification requests from the UE to the IMS. For example, the subscriber may desire to change a call forwarding telephone number or turn off call waiting.

In many cases, no specific feature invocation is required for supplementary services that are simply invoked under particular circumstances. For example, unconditional call forwarding will occur whenever a call appears destined for a UE that has this feature turned on. Many useful features behave this way, including number identification, name identification, call offering, closed user group, user-to-user, charging, and call restriction. The S-CSCF or associated application server is aware of the status of each feature it implements and behaves accordingly when the invoking conditions occur, as defined by each feature.

Other features, such as call deflection, call completion, multi-party, and call transfer, require explicit invocation during active calls since they typically result in one or more changes to call legs associated with a UE. These features are realized by one of or a combination of the following methods: 1) iMSC initiates standard SIP call control procedures in response to the appearance of a feature invocation condition; or 2) iMSC forwards a feature invocation indication to the S-CSCF to cause the S-CSCF or an associated application server to begin SIP procedures to realize the feature. In the second case, the iMSC forwards the feature invocation indication as a SIP Require header field, including the corresponding option tag and parameters, within the INVITE, INFO, or possibly other methods. SIP B2BUA (back-to-back user agent) or 3pcc (third party call control) procedures may be used by the S-CSCF or application server to realize various features. Some features may require the availability of transcoders, conference bridges, announcement functions, or other media capabilities. These are accessible as needed via the MRF or MGWs in the architecture.

While this invention has been described in terms of certain examples thereof, it is not intended that it be limited to the above description, but rather only to the extent set forth in the claims that follow.

I claim:

1. A method for registering a mobile unit with a communication system including a serving system and a home system, the serving system comprising an interworking MSC (iMSC) and an Internet Protocol Multimedia Subsystem (IMS), the home system comprising a Gateway MSC (GMSC) and a Home Subscriber Server (HSS), the method comprising:
   performing a location update procedure by the mobile unit;
   processing by the serving system the registration by authenticating the mobile unit and informing the HSS of the location of the current serving system;
   determining that the serving system must process the mobile unit as an iMSC; and emulating the services of the iMSC by the IMS.

2. A method for registering a mobile unit in accordance with claim 1, wherein the step of performing a location update procedure is done to indicate a change in the serving system.

3. A method for registering a mobile unit in accordance with claim 1, further comprising the step of originating a call with the serving system.

4. A method for registering a mobile unit in accordance with claim 3, wherein the step of originating a call with the serving system comprises:
   receiving a call request at the serving system;
   performing interworking between call control procedures between the iMSC and IMS;
   forwarding the call to a Border Gateway Control Function (BGCF) and Media Gateway Control Function (MGCF); and
   interworking between the MGCF and a Public Switched Telephone Network (PSTN).

5. A method for registering a mobile unit in accordance with claim 1, further comprising the step of performing features and services for the mobile unit within the IMS in the serving system.

6. A method for registering a mobile unit in accordance with claim 1, further comprising the steps of:
receiving a call termination by the GMSC in the home system;
forwarding the call termination to the IMS in the serving system; and
forwarding the call termination to the iMSC in the serving system.

7. A method for registering a mobile unit in accordance with claim 6, wherein the step of forwarding the call termination to the IMS comprises:
forwarding the call termination from the GMSC to the MGCF;
forwarding the call termination from the MGCF to the I-CSCF; and
forwarding the call termination from the I-CSCF to the S-CSCF.

8. A method for registering a mobile unit with a communication system including a serving system and a home system, the serving system comprising a mobile switching center (MSC) and an interworking MSC (iMSC), the home system comprising an Internet Protocol Multimedia Subsystem (IMS) and a Home Subscriber Server (HSS), the method comprising:
performing a location update procedure by the mobile unit;
processing by the serving system the registration by authenticating the mobile unit and informing the HSS of the location of the current serving system; and
determining if the serving system can process the mobile unit as an iMSC.

9. A method for registering a mobile unit in accordance with claim 8, wherein the step of performing a location update procedure is done to indicate a change in the serving system.

10. A method for registering a mobile unit in accordance with claim 8, further comprising the step of originating a call with the serving system.

11. A method for registering a mobile unit in accordance with claim 10, wherein the step of originating a call with the serving system comprises:
receiving a call request at the serving system;
performing interworking between call control procedures by the iMSC in the serving system and the IMS in the home system; and
forwarding the call from the IMS to the called party.

12. A method for registering a mobile unit in accordance with claim 8, further comprising the step of performing features and services for the mobile unit within the IMS in the home system.

13. A method for registering a mobile unit in accordance with claim 8, further comprising the steps of:
receiving a call termination by the IMS in the home system; and
forwarding the call termination to the iMSC in the serving system.

* * * * *